US005566049A

United States Patent [19]

Nguyen

[11] Patent Number: 5,566,049
[45] Date of Patent: Oct. 15, 1996

[54] MULTIDIRECTIONAL INDEPENDENT SUSPENSION DISK MOUNTING SYSTEM

[75] Inventor: Dung J. Nguyen, San Diego, Calif.

[73] Assignee: AT&T Global Information Solutions Company, Dayton, Ohio

[21] Appl. No.: 499,512

[22] Filed: Jul. 7, 1995

[51] Int. Cl.⁶ .................. H05K 7/12; G06F 1/16; F16M 13/00
[52] U.S. Cl. .............. 361/685; 248/638; 248/581; 248/221.11
[58] Field of Search .................. 361/379, 683, 361/684, 685, 686, 724, 725; 360/97.01, 97.03, 98.01, 98.06, 98.08; 248/500, 560, 581, 638, 610, 221.1, 221.4, 223.4; 364/708.1

[56] References Cited

U.S. PATENT DOCUMENTS

| 5,081,552 | 1/1992 | Glaser et al. | |
| 5,112,119 | 5/1992 | Cooke et al. | 312/283 |
| 5,216,582 | 6/1993 | Russell et al. | 361/685 |
| 5,329,412 | 7/1994 | Stefansky . | |
| 5,333,098 | 7/1994 | DeLuca et al. | 361/685 |
| 5,398,157 | 3/1995 | Paul | 361/684 |
| 5,435,737 | 7/1995 | Haga et al. | 439/157 |
| 5,463,527 | 10/1995 | Hager et al. | 361/685 |

*Primary Examiner*—Leo P. Picard
*Assistant Examiner*—Lynn D. Feild
*Attorney, Agent, or Firm*—Merchant, Gould, Smith, Edell, Welter & Schmidt

[57] ABSTRACT

A system for vertically mounting 3.5-inch disk drives includes a main disk support bracket, first and second disk retainers, and a center disk support bracket. The system allows independent suspension mounting in any orientation of one, two, three or four disk drives which are isolated from mechanical stresses, vibration and shock.

20 Claims, 5 Drawing Sheets

MULTIDIRECTIONAL INDEPENDENT SUSPENSION DISK MOUNTING SYSTEM

BACKGROUND OF THE INVENTION

1. Field Of The Invention

This invention relates to mounting systems for magnetic disk drives, and more particularly to an independent suspension mounting system allowing 3.5-inch industry standard disk drives to be mounted in any orientation within a cabinet enclosure.

2. Description Of The Related Art

Magnetic disk storage devices are becoming increasingly susceptible to problems arising from vibration and shock and from uneven securing or clamping forces. As disk drive technology follows a continuing trend towards increased data storage capacity while disk size is kept within standardized dimensions, even minuscule displacements due to mechanical perturbations or localized stresses can cause errors in disk write and read operations. Also, the prevalence of portable computers such as lap-tops, and the increasing use of computers installed in moving vehicles and transportable platforms have imposed demanding mounting requirements to protect disk drives against vibration and shock. It is to be understood that the terms "disk drive" and "disk" are used synonymously herein.

One example of an industry standard disk drive comprises the 3.5-inch DEC Corporation model DSP3210 disk drives. In order to allow a vibration damping mechanism built-in by the disk manufacturer to be fully effective, each disk must be mounted so that if subjected while in operation to shock (up to 10 G peak half-sine and 10 msec duration (3-axes)) or vibration (22–500 Hz @ 0.5 G peak), its displacement in any direction ("drive envelope sway space") does not exceed 0.050 inch. During shipping, pre-installed disks must withstand the shock of a 30-inch drop and multiple bounces, and vibration up to 5–300 Hz @ 1.03 G rms. Disks also must be easily removable for replacement or upgrading.

The industry standard for drives incorporating a 3.5-inch disk is a generally rectangular box 5.75 inches long, 4.00 inches wide, and 1.63 inches high. The DSP3210 drive includes an H-shaded mounting bracket rigidly at attached to the top surface of the box. Consequently, any mounting device must accommodate these "form factor" dimensions and include an interface compatible with the bracket.

Examples of techniques for securely mounting such disk drives can be found in the prior art. However, such techniques are often costly to produce and time-consuming to assemble. Also, such techniques often do not meet the above-cited shock and vibration specifications for operating and shipping environments. Moreover, such techniques rarely provide 0.050-inch of clearance on all sides, so that the disk drives are at risk to damage from collisions with enclosure walls.

SUMMARY OF THE INVENTION

To overcome the limitations in the prior art described above, and to overcome other limitations that will become apparent upon reading and understanding the present specification, the present invention discloses a 3.5-inch disk drive mounting system, which allows independent vertical or horizontal mounting (or mounting at some angle therebetween) of from one to four disks per module in a cabinet enclosure without inducing mechanical stresses interfering with disk operation, while providing 0.050-inch clearance on all sides enabling disks to freely execute small motions in any direction when perturbed by shock and vibration environments.

A preferred embodiment includes a main disk support bracket, first and second disk retainers, and a center disk support bracket. The main disk support bracket includes a generally planar central portion with four serially disposed stamped-out holes each hole having a contour geometrically similar to and slightly larger than a disk drive. The central portion is disposed between first and second end column support portions generally orthogonal to the central portion. Each generally rectangular and planar disk retainer includes a central portion with four serially disposed oval-shamed stamped-out holes disposed between opposed "tongue" and "groove" end portions. The groove end portion of the first disk retainer mates with the tongue end portion of the second disk retainer. The center disk support bracket includes a generally rectangular and planar central portion disposed between a planar upper lip and opposed first and second planar mounting tabs each orthogonal to the central portion. The center disk support bracket is disposed symmetrically between the two disk retainers so that the mating tongue and groove end portions of the second and first disk retainers, respectively, are rigidly attached to the lip of the center disk support bracket, and the center disk support bracket tabs are rigidly attached at the median of the main disk support bracket central portion.

The end column supports of the main disk support bracket are first rigidly attached to the base of a cabinet enclosure. Then the H-shaped mounting bracket of each disk to be mounted is rigidly attached to a disk retainer to form a "disk assembly". Thus, a disk assembly can include either one or two disks. Each disk assembly is then rigidly attached between an end column support and the center disk support bracket so that the disks are in effect attached to the cross-member of a suspension bridge.

A primary object of the present invention to provide a disk drive mounting system having improved resistance to vibration and g-force environments compared to previously developed mounting systems.

Another object of the invention is to provide a disk mounting system which allows disks to be mounted in any orientation within an enclosure.

A further object of the invention is to provide a disk mounting system which allows each disk to be independently mounted so as to minimize stresses when the disk is oriented vertically or horizontally (or at some angle therebetween).

A still further object of the invention is to provide a disk mounting system accommodating one, two, three or four disks without necessitating modification of the mounting system configuration.

Yet another object of the invention is to provide a disk mounting system that is simple and inexpensive to manufacture, and easy to assemble.

A further object of the invention is to provide a disk mounting system facilitating disk installation and removal.

Other objects of the invention will become evident when the following description is considered with the accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
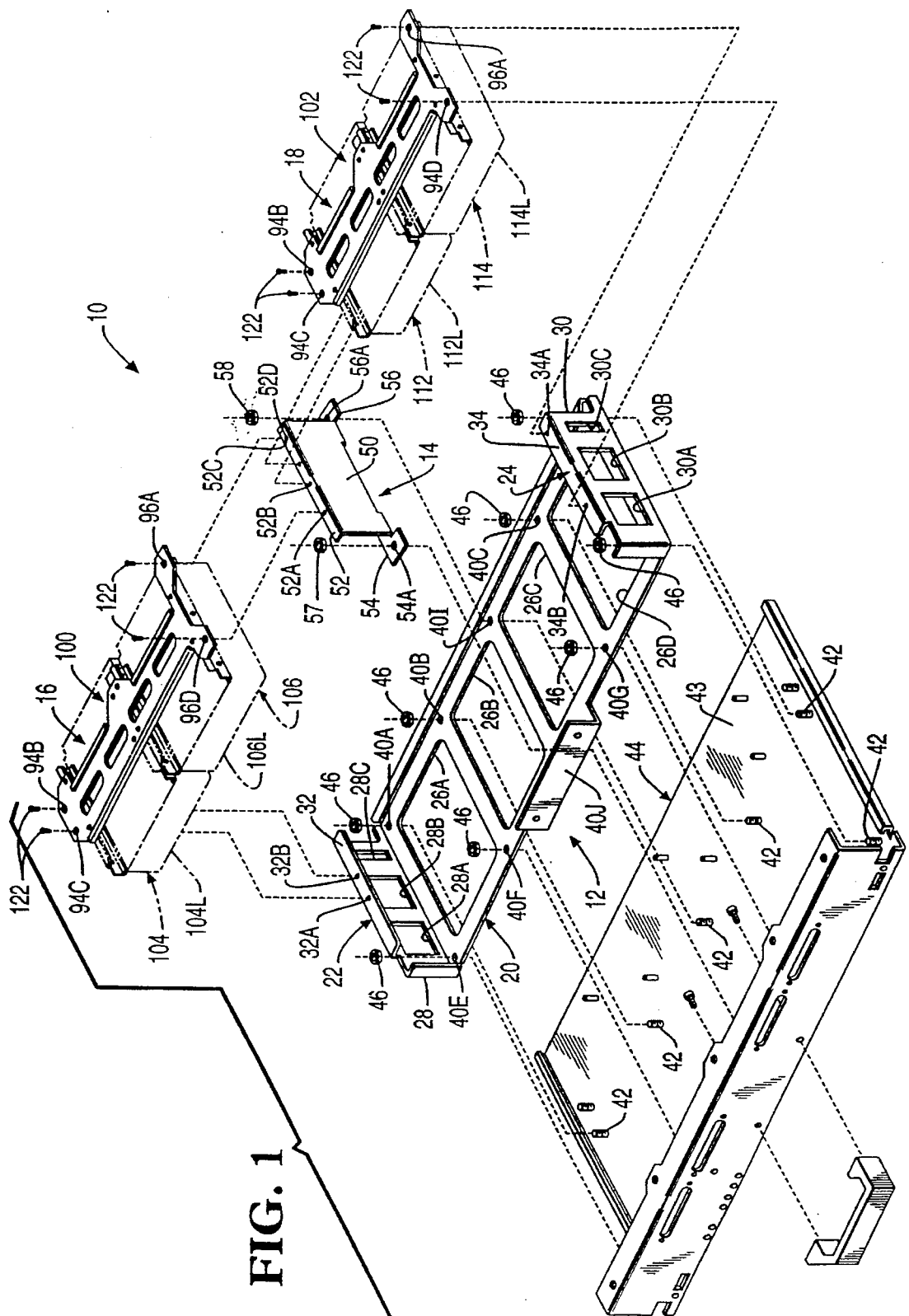
FIG. 1 is an exploded perspective view of a preferred embodiment including a main disk support bracket first and second disk retainers, and a center disk support bracket.

Referring to FIG. 1, a preferred embodiment of a disk module 10 includes a main disk support bracket 12, a center disk support bracket 14, and first and second disk retainers 16, 18.

Figure 2:
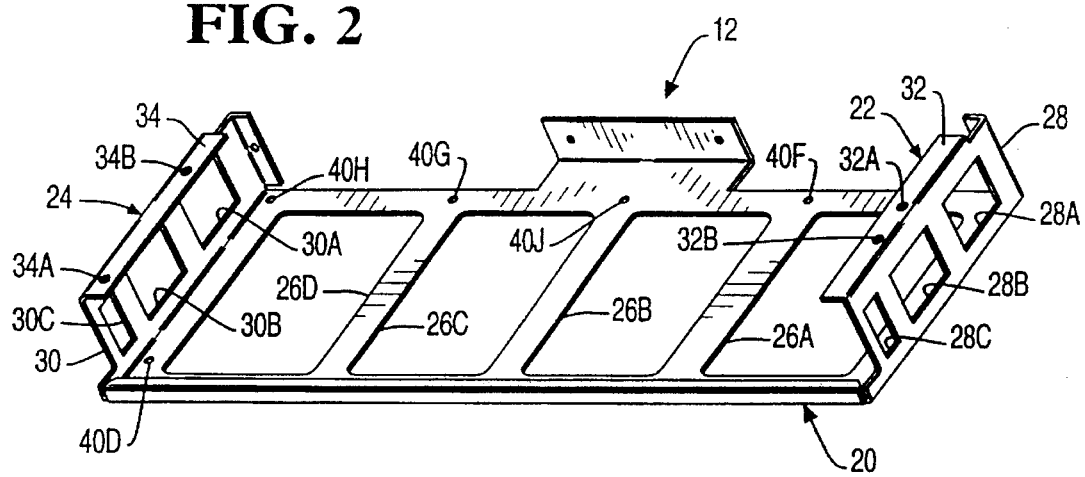
FIG. 2 is a perspective view of the main disk support bracket of FIG. 1.

As shown in FIGS. 1 and 2, the main disk support bracket 12 includes a generally planar rectangular-shaped central portion 20 disposed between first and second end column support portions 22, 24. Central portion 20 includes four symmetrically disposed stamped-out rectangular holes 26A, 26B, 26C, 26D serially aligned along the longer dimension. Holes 26A. 26B, 26C, 26D each have a contour geometrically similar to and slightly larger than a 3.5-inch disk so that a rigidly mounted disk circumscribed by a hole can freely execute small displacements in any lateral direction without touching the hole perimeter. End column support portions 22, 24 include a generally planar rectangular section 28, 30, respectively, generally orthogonal to central portion 20, and an upper lip 32, 34, respectively, generally parallel to central portion 20. Lips 32, 34 include, respectively, threaded holes 32A, 32B, and 34A, 34B. Sections 28, 30 include first and second stamped-out square holes 28A, 28B and 30A, 30B, respectively, and a stamped-out rectangular hole 28C, 30C, respectively, the holes 28A, 28B, 28C and 30A, 30B, 30C serially aligned, respectively, along the longer dimension of sections 28, 30. As shown in FIGS. 1 and 2, central portion 20 further includes a plurality of holes 40A, 40B, 40C, 40D, 40E, 40F, 40G, 40H disposed to each closely receive a corresponding stud 42 mounted vertically on a surface 43 of a cabinet enclosure mounting board 44, and opposed threaded holes 40I, 40J. Main disk support bracket 12 is secured to mounting board 44 by tightening a nut/conical washer 46 on each stud.

Preferably, bracket 12 is fabricated from 0.075-inch zinc-plated CRS (cold rolled steel) AISI (American Iron and Steel Institute) 1010 or 1018 (carbon content) steel, central portion 20 is about 18.00 inches×6.36 inches; holes 26A, 26B, 26C, 26D are about 4.8 inches×3.5 inches; sections 28, 30 are about 7.04 inches×1.92 inches; and upper lips 32, 34 are about 0.55 inch wide.

Figure 3:
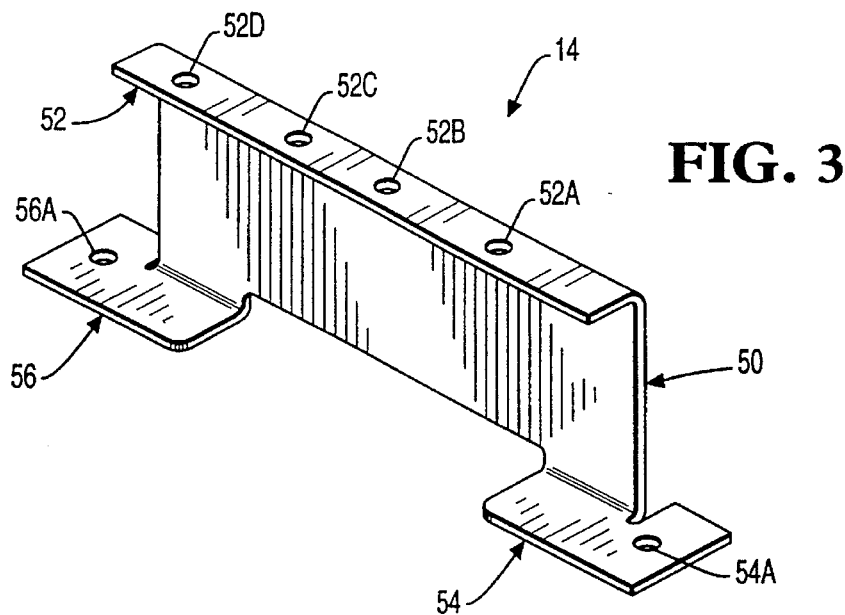
FIG. 3 is a perspective view of the center disk support bracket of FIG. 1.

As shown in FIGS. 1 and 3, center disk support bracket 14 includes a generally planar and rectangular central portion 50 disposed between an upper lip 52 and opposed first and second mounting tabs 54, 56, each generally orthogonal to cent al portion 50. Lip 52 includes four threaded holes 52A 52B, 52C, 52D disposed so that their centers are collinear. Tabs 54, 56 include therethrough, respectively, hole 54A, 56A. Bracket 14 is rigidly attached to central portion 20 of bracket 12 by screws 57, 58 through holes 54A, 56A, respectively, and threaded into holes 40J, 40I, respectively.

Preferably, bracket 14 is fabricated from 0.075-inch zinc-plated CRS AISI 1010 or 1018 steel, central portion 50 is about 4.72 inches×1.85 inches; lip 52 is about 0.54-inch wide; separation between the centers of holes 52A and 52B 52B and 52C, 52C and 52D is about 1.12-inches, 0.88-inch, 1.12-inches, respectively; and tabs 54, 56 are about 1.78 inches×1.00 inch.

Figure 4:
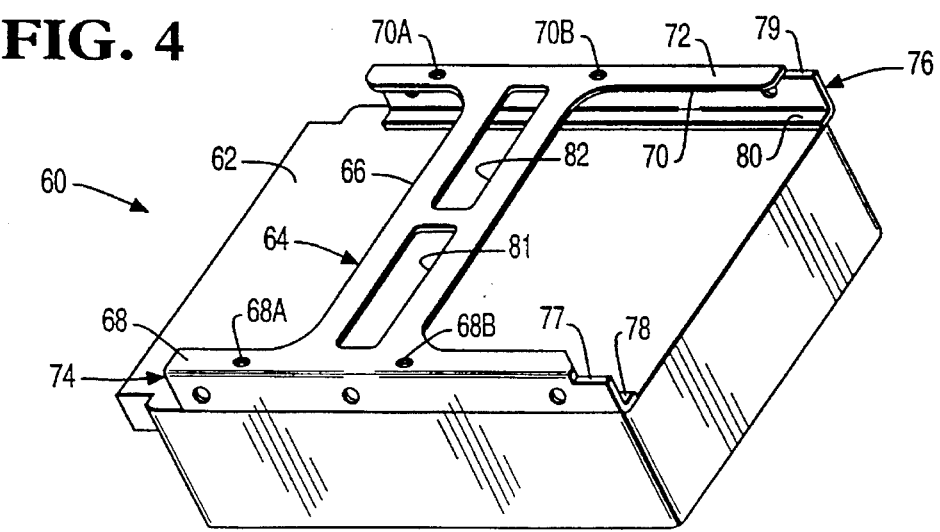
FIG. 4 is a perspective view common to the disks mounted in the embodiment of FIG. 1.

FIG. 4 is a perspective view of a 3.5-inch four gigabyte (4 GB) differential SCSI disk drive 60 including a top surface 62 rigidly attached to an H-shaped mounting bracket 64, such as are mounted in the disk module 10. Bracket 64 (not part of the invention) includes a generally planar cross-piece member 66 disposed transversely between opposed parallel first and second planar members 68, 70 rigidly attached along an outer edge 71, 72, respectively, to first and second angle members 74, 76 having mutually orthogonal flanges 77, 78 and 79, 80, respectively. Member 66 includes symmetrically disposed first and second oval-shaped stamped out holes 81, 82. Members 68, 70 include, respectively, threaded screw-holes 68A, 68B and 70A, 70B.

Figure 5:
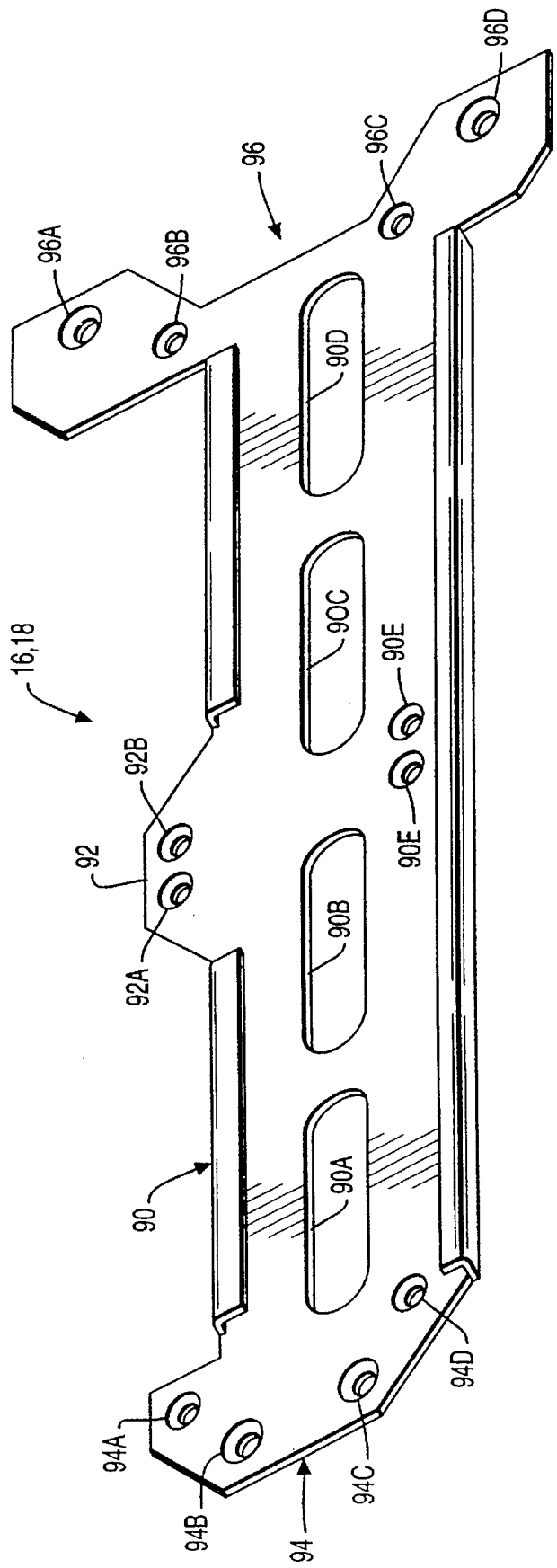
FIG. 5 is a perspective view common to the disk retainers of FIG. 1.

Referring to FIG. 5, disk retainers 16, 18 each include a generally planar central portion 90 including a medial flange 92 disposed between a tongue end portion 94 and a groove end portion 96. Central portion 90 includes two pairs of oval-shaped stamped-out holes 90A, 90B and 90C, 90D, each pair approximately congruent to holes 81, 82 of a disk 60, the four holes serially and symmetrically disposed along the longer dimension. Central portion 90 also includes therethrough first and second medial holes 90E, 90F. Flange 92 includes therethrough first and second holes 92A, 92B opposite, respectively, holes 90E, 90F. Tongue end portion 94 includes holes 94A, 94B, 94C, 94D. Groove end portion 96 includes holes 96A, 96B, 96C, 96D.

Preferably, disk retainers 16, 18 are fabricated from 0.075-inch zinc-plated CRS AISI 1010 or 1018 steel. Each disk retainer has a total length of about 9.22 inches, a tongue end portion 94 about 4.12-inches in width, and a groove end portion 96 about 2.50-inches in width.

Figure 6:
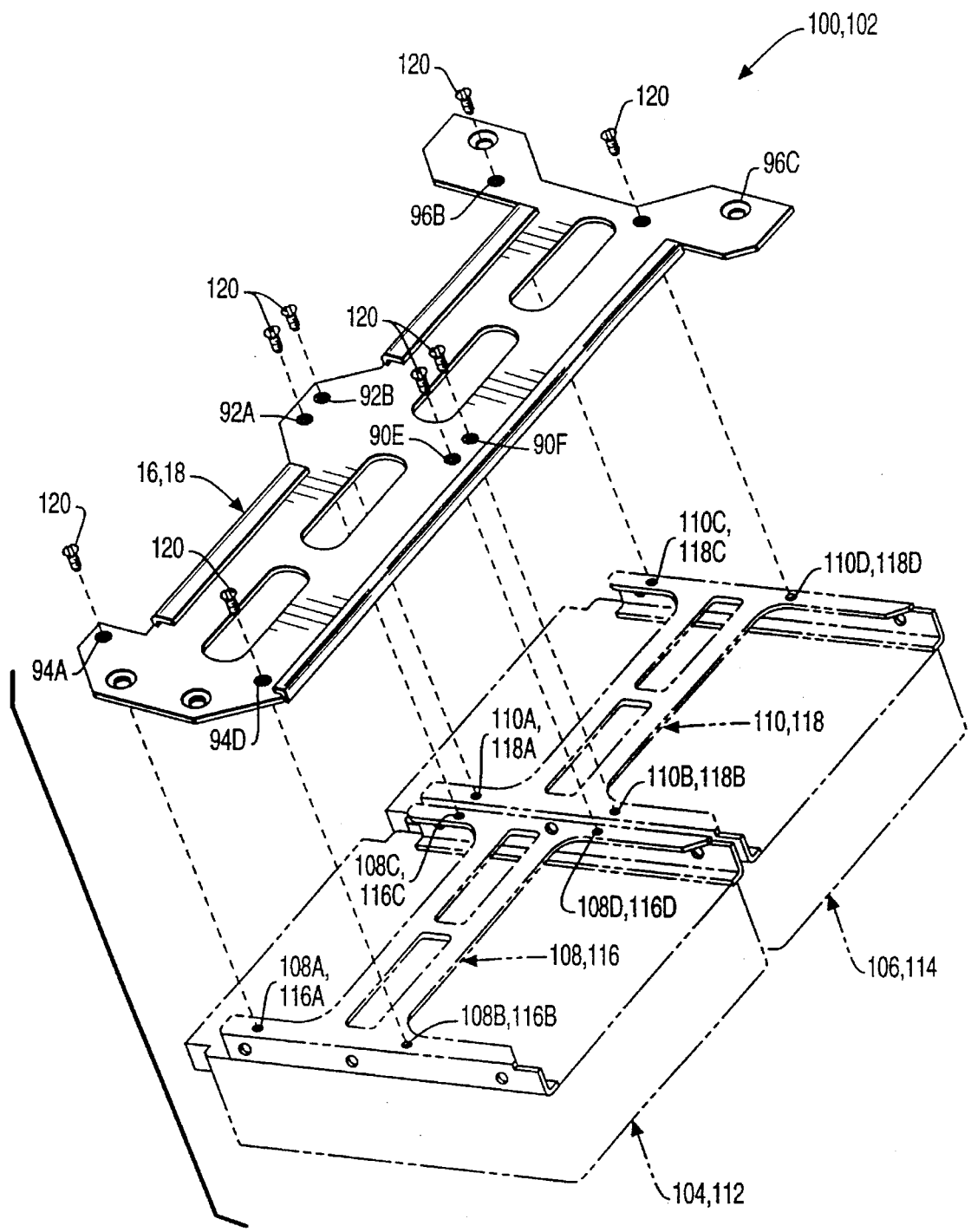
FIG. 6 is an exploded perspective view of a disk retainer according to FIGS. 1 and 5 attached to two disks according to FIG. 4.

FIGS. 1 and 6 show first and second disk assemblies 100, 102 including respectively, disk retainer 16 and first and second disks 104, 106 rigidly attached as in FIG. 4 to H-shaped brackets 108, 110, and disk retainer 18 and third and fourth disks 112, 114 rigidly attached to H-shaped brackets 116, 118. Brackets 108 and 110 include, respectively, holes 108A, 108B, 108C, 108D and 110A, 110B, 110C, 110D. Brackets 116 and 118 include, respectively, holes 116A, 116B, 116C, 116D and 118A, 118B 118C, 118D. Disks 104, 106 are rigidly attached to disk retainer 16 and disks 112, 114 are rigidly attached to disk retainer 18 using a plurality of flat-head screws 120 after aligning, respectively, holes 94A, 94D, 92A, 90E, 92B, 90F, 96B, 96C in disk retainer 16 with holes 108A, 108B, 108C, 108D, 110A, 110B, 110C, 110D in brackets 108 and 110, and aligning, respectively, holes 94A, 94D, 92A, 90E,, 92B, 90F, 96B, 96C in disk retainer 18 with holes 116A, 116B, 116C, 116D, 118A, 118B, 118C, 118D in brackets 116 and 118.

Referring to FIGS. 1, 2, 3 and 5, disk assembly 100 is rigidly attached to lip 32 of end column support portion 22 and to lip 52 of bracket 14 by a flat-head screw 122 through each of the aligned hole pairs (94B, 32B), (94C, 32A), (96A, 52D), (96D, 52A). Disk assembly 102 is rigidly attached to lip 34 of end column support portion 24 and to lip 52 of bracket 14 by a flat-head screw 122 through each of the aligned hole pairs (96A, 34A), (96D, 34B), (94B, 52C), (94C, 52B). As shown in FIG. 1, tongue end portion 94 of disk retainer 18 is closely received within groove end portion 96 of disk retainer 16 when the screws 122 are tightened. Disks 104, 106, 112, 114 are received in their lower portion 104L, 106L, 112L, 114L, respectively, within holes 26A, 26B, 26C, 26D, respectively, with a minimum clearance of 0.25 inches.

Thus, since main disk support bracket 12 is rigidly attached to cabinet enclosure mounting board 44 and disk assemblies 102 and 104 are rigidly connected to bracket 12 through end column supports 22, 24 and center bracket 14, disks 104, 106, 112, 114 are independently suspended so that no portion of a disk is subjected to mechanical stress, and the disks are buffered against direct shock and vibration. Since the disks are independently mounted, any disk(s) may be removed from the disk module 10 without affecting the suspension behavior of the remaining disk(s).

Figure 7:
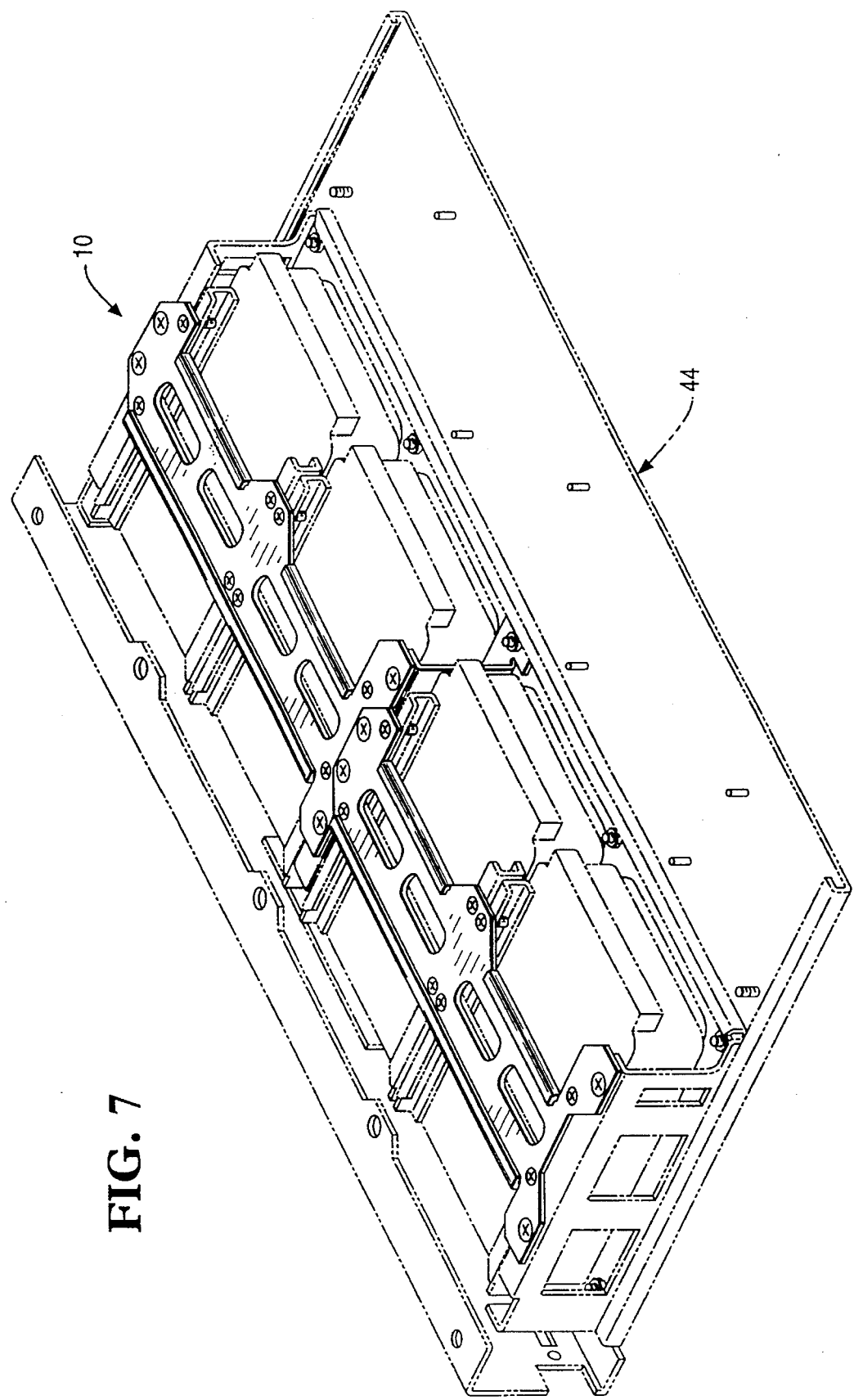
FIG. 7 is a perspective view of the embodiment of FIG. 1 attached to a cabinet enclosure mounting plate.

FIG. 7 shows the disk module 10 mounted on the cabinet, enclosure mounting board 44. It is envisioned, for example, that the mounting board 44 may comprise a printed circuit board, which may or may not contain disk drive controller electronics, wiring, and connectors in order to interface the disk drives into a target computer system. Further, it is envisioned that, in at least one embodiment, the mounting board 44 has dimensions substantially identical to a processor board for the computer system and resides in a slot in the same or a similar cabinet enclosure as one or more processor boards, thereby significantly enhancing the packaging for the computer system. Generally, the mounting board 44 may be inserted into a slot either in a vertical or horizontal (or other) orientation in a cabinet enclosure.

This concludes the description of the preferred embodiment of the invention. In summary, a system for vertically or horizontally mounting 3.5-inch disk drives has been disclosed, wherein the system includes a main disk support bracket, first and second disk retainers, and a center disk support bracket. The system allows independent suspension mounting in any orientation of one, two, three or four disk drives which are isolated from mechanical stresses, vibration and shock.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device for mounting a plurality of disk drives within a cabinet enclosure, comprising:

a main support bracket including a generally planar, rectangular first central portion, the first central portion disposed between first and second end column support portions generally orthogonal to the first central portion;

a center support bracket coupled to the main support bracket and extending generally orthogonally therefrom; and a first retainer bracket coupled to one or more of the disk drives and including a generally planar, rectangular central portion disposed between opposing end portions, wherein a first one of the opposing end portions is rigidly attached to the first end column support portion, and a second one of the opposing end portions is rigidly attached to the center support bracket; and a second retainer bracket coupled to one or more of the disk drives and including a generally planar, rectangular central portion disposed between opposing end portions, wherein a first one of the opposing end portions is rigidly attached to the second end column support portion, and a second one of the opposing end portions is rigidly attached to the center support bracket.

2. A device as recited in claim 1, wherein the first and second retainer brackets are each coupled to two disk drives.

3. The device of claim 1, wherein the main support bracket, center support bracket, and first and second retainer brackets are attached to a generally planar mounting board.

4. The device of claim 3, wherein the mounting board is vertically oriented.

5. The device of claim 3, wherein the mounting board is horizontally oriented.

6. A device for mounting a plurality of disk drives within a cabinet enclosure, each of the disk drives having a common predetermined length, width and height determining generally planar, parallel top and bottom surfaces, the device comprising:

a main disk support bracket including a generally planar, rectangular first central portion, the first central portion disposed between first and second end column support portions generally orthogonal to the first central portion, each end column support portion terminating in all upper lip generally parallel to the first central portion;

a center disk support bracket including a generally planar second central portion disposed between a planar upper lip and opposed first and second mounting tabs, the upper lip and mounting tabs orthogonal to the second central portion, the mounting tabs rigidly attached at a median of the first central portion;

first and second disk retainers each including a generally planar, rectangular third central portion disposed between opposed tongue and groove end portions, the tongue end portion of the first disk retainer rigidly attached to the upper lip of the first end column support portion, the groove end portion of the first disk retainer and the tongue end portion of the second disk retainer rigidly attached to the upper lip of the center disk support bracket, the groove end portion of the second disk retainer rigidly attached to the upper lip of the second end column support portion, the tongue end portion of the second disk retainer closely received within the groove end portion of the first disk retainer; and a bracket rigidly attached to a top surface of each disk drive and rigidly attached to either the first or second disk retainer, the disk drive being encompassed with boundaries set by the first central portion of the main disk support bracket.

7. A device as recited in claim 6, wherein the first and second disk retainers are each coupled to two disk drives.

8. The device of claim 6, wherein the main disk support bracket, center disk support bracket, and first and second disk retainers are attached to a generally planar mounting board.

9. The device of claim 8, wherein the mounting board is vertically oriented.

10. The device of claim 8, wherein the mounting board is horizontally oriented.

11. A device for mounting at most four disk drives within a slotted compartment of a cabinet, each of the disk drives having a common predetermined length, width and height determining generally planar, parallel top and bottom surfaces, the device comprising:

a main disk support bracket including a generally planar, rectangular central portion bisected by a median transverse to the longer dimension and having two pairs of serially disposed generally rectangular holes, each pair of holes disposed symmetrically with respect to the median, each hole having a common length and width slightly larger than the disk drive length and width, the central portion disposed between first and second end column support portions generally orthogonal to the central portion, each end column support portion including a generally planar rectangular section generally orthogonal to the central portion and extending upwardly in a planar lip orthogonal to the section and generally parallel to the central portion;

a center disk support bracket including a generally planar middle portion having opposed parallel upper and lower edges, the upper edge rigidly attached to a planar lip orthogonal to the middle portion, the lower edge rigidly attached to opposed first and second mounting tabs orthogonal to the middle portion, the mounting tabs rigidly attached at the median of the central portion of the main disk support bracket;

first and second disk retainers each including a generally planar, rectangular central portion having a medial flange and disposed between opposed tongue and groove end portions, the tongue end portion of the first disk retainer rigidly attached to the lip of the first end column support portion, the groove end portion of the first disk retainer and the tongue end portion of the second disk retainer rigidly attached to the lip of the center disk support bracket, the groove end portion of the second disk retainer rigidly attached to the lip of the second end column support portion, the tongue end portion of the second disk retainer closely received within the groove end portion of the first disk retainer; and an H-shaped bracket rigidly connected to a top surface of a disk drive, the H-shaped bracket being rigidly attached to an end portion and the medial flange of the first or second disk retainer, the bottom surface of each disk drive circumscribed by a hole in the central portion of the main disk support bracket.

12. The device of claim 11, wherein the main disk support bracket, center disk support bracket, and first and second disk retainers are fabricated from a metallic material.

13. The device of claim 12, wherein the metallic material is a zinc-plated steel sheeting of about 0.075-inch thickness.

14. The device of claim 13, wherein the steel is CRS AISI 1010.

15. The device of claim 13, wherein the steel is CRS AISI 1018.

16. The main disk support bracket of claim 11, wherein the central portion is about 18.00 inches in length and 6.36 inches in width, each hole in the central portion is about 4.8 inches×3.5 inches, each rectangular section is about 7.04 inches×1.92 inches, and each lip is about 0.55-inch in width.

17. The center disk support bracket of claim 11, wherein the middle portion is about 4.72 inches×1.85 inches, the lip is about 0.54-inch in width, and the mounting tabs are each about 1.78 inches×1.00 inch.

18. The disk retainers of claim 11, wherein the total length of each disk retainer is about 9.22 inches, each tongue end portion is about 4.12-inches in width, and each groove end portion is about 2.50-inches in width.

19. A device as recited in claim 11, wherein the first and second disk retainers are each coupled to two disk drives.

20. The device of claim 11, wherein the main disk support bracket, center disk support bracket, and first and second disk retainers are attached to a generally planar mounting board.

\* \* \* \* \*

UNITED STATES PATENT AND TRADEMARK OFFICE
CERTIFICATE OF CORRECTION

PATENT NO. : 5,566,049

DATED : October 15, 1996

INVENTOR(S) : Dung J. Nguyen

It is certified that error appears in the above-identified patent and that said Letters Patent is hereby corrected as shown below:

Column 2, line 8, after "holes", insert a comma --,--.

Column 2, line 14, "oval-shamed" should read --oval-shaped--.

Column 3, line 39, after "26A" change the period "." to a comma --,--.

Column 4, line 51, after "including" insert a comma --,--.

Column 6, line 34, after "in", "all" should read --an--.

Signed and Sealed this

First Day of April, 1997

*Attest:*

BRUCE LEHMAN

*Attesting Officer*  Commissioner of Patents and Trademarks